United States Patent
Takeda et al.

(10) Patent No.: US 8,527,175 B2
(45) Date of Patent: Sep. 3, 2013

(54) BRAKING/DRIVING CONTROL APPARATUS FOR VEHICLE

(75) Inventors: Masayoshi Takeda, Kariya (JP); Masaki Maruyama, Nagoya (JP); Yukio Mori, Kariya (JP); Kazuya Taniguchi, Nagoya (JP); Daisuke Tokumochi, Anjo (JP)

(73) Assignees: Advics Co., Ltd., Aichi-pref. (JP); DENSO CORPORATION, Kariya (JP)

( * ) Notice: Subject to any disclaimer, the term of this patent is extended or adjusted under 35 U.S.C. 154(b) by 274 days.

(21) Appl. No.: 13/156,621

(22) Filed: Jun. 9, 2011

(65) Prior Publication Data

US 2011/0307154 A1    Dec. 15, 2011

(30) Foreign Application Priority Data

Jun. 10, 2010    (JP) .................................. 2010-132799

(51) Int. Cl.
*B60T 8/17* (2006.01)
*F16H 59/78* (2006.01)

(52) U.S. Cl.
USPC .................................. 701/70; 701/87; 477/84

(58) Field of Classification Search
USPC ....................... 701/70, 87, 54; 477/98, 84, 91
See application file for complete search history.

(56) References Cited

U.S. PATENT DOCUMENTS

| 5,954,779 | A  | * | 9/1999 | Dietzel ............................ 701/87 |
| 6,939,265 | B2 | * | 9/2005 | Rustige et al. .................... 477/84 |
| 2009/0043473 | A1 |  | 2/2009 | Nakai et al. |
| 2009/0125199 | A1 | * | 5/2009 | Kaigawa ........................ 701/54 |

FOREIGN PATENT DOCUMENTS

JP    A-2009-40308    2/2009

* cited by examiner

*Primary Examiner* — Tan Q Nguyen
(74) *Attorney, Agent, or Firm* — Posz Law Group, PLC (57) ABSTRACT

A braking/driving control apparatus for a vehicle includes a basic control unit which calculates and outputs a target axle torque based on a target acceleration and a driving resistance of the vehicle and which determines an axle torque for a power train of the vehicle and an axle torque for a braking apparatus of the vehicle based on the calculated target axle torque, a sliding-down prediction determining unit which determines whether there is a possibility that the vehicle slides down rearwards on an uphill road, and a sliding-down preventing process executing unit which performs a process for reducing a possibility that the vehicle slides down, based on a determination result of the sliding-down prediction determining unit. After the sliding-down prediction determining unit determines that there is the possibility, the sliding-down preventing process executing unit controls the basic control unit to calculate and output the target axle torque so as to reach an axle torque which is obtained by reducing a predetermined positive amount form an estimated value of an axle torque necessary for the vehicle to achieve the target acceleration against the driving resistance.

3 Claims, 6 Drawing Sheets

BRAKING/DRIVING CONTROL APPARATUS FOR VEHICLE

CROSS REFERENCE TO RELATED APPLICATIONS

This application is based on and claims priority under 35 U.S.C. §119 to Japanese Patent Application 2010-132799, filed on Jun. 10, 2010, the entire content of which is incorporated herein by reference.

BACKGROUND

1. Field of the Invention

The present invention relates to a braking/driving control apparatus for a vehicle.

2. Description of Related Art

JP-A-2009-040308 describes a technique of suppressing sliding down of a vehicle on an uphill road. Specifically, there is provided a vehicle control apparatus for controlling driving force, which estimates a gradient of the uphill road and generates braking force according to the estimated road gradient, thereby suppressing the sliding down of the vehicle.

However, if the estimated road gradient has an error by even little amount, a target axle torque could be set to be larger than necessary torque (i.e., an amount of braking might be insufficient). In this case, the vehicle slides down, so that a driver might feel fear or discomfort.

SUMMARY

The present invention has been made in view of the above circumstances, and it is an object of the present invention to reduce the possibility that the vehicle slides down due to an error in an estimated road gradient in a technique of suppressing sliding-down of a vehicle on an uphill road.

In order to achieve the above object, there is provided a braking/driving control apparatus for a vehicle includes: a basic control unit which calculates and outputs a target axle torque based on a target acceleration set as an acceleration of the vehicle to be achieved and a driving resistance of the vehicle including an effect of gravity according to a gradient of a road, and which determines an axle torque to be required for a power train of the vehicle and an axle torque to be required for a braking apparatus of the vehicle based on the calculated target axle torque; a sliding-down prediction determining unit which determines whether there is a possibility that the vehicle slides down rearwards on an uphill road, during deceleration of the vehicle; and a sliding-down preventing process executing unit which performs a process for reducing a possibility that the vehicle slides down, based on a determination result of the sliding-down prediction determining unit. Until the sliding-down prediction determining unit determines that there is a possibility that the vehicle slides down rearwards on an uphill road, the sliding-down preventing process executing unit controls the basic control unit to calculate and output the target axle torque so as to reach an estimated value of an axle torque which is necessary for the vehicle to achieve the target acceleration against the driving resistance. After the sliding-down prediction determining unit determines that there is a possibility that the vehicle slides down rearwards on an uphill road, the sliding-down preventing process executing unit controls the basic control unit to calculate and output the target axle torque so as to reach an axle torque which is obtained by reducing a predetermined positive amount form the estimated value of the axle torque necessary for the vehicle to achieve the target acceleration against the driving resistance.

According to the above configuration, even when a value, which is estimated as an estimated value of an axle torque necessary for the vehicle to achieve the target acceleration against the driving resistance, becomes a value (at which braking torque is insufficient) greater than axle torque, which is required in correspondence to an actual gradient, due to an influence of a detection error of the road gradient, the target axle torque is reduced by a predetermined positive amount from the estimated value. Accordingly, a possibility may be increased which the target axle torque is a value (at which the braking torque is sufficient) smaller than the estimated value of the axle torque, which is required in correspondence to the actual gradient. Hence, it may be possible to reduce a possibility that the vehicle slides down due to an error of the estimated road gradient.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
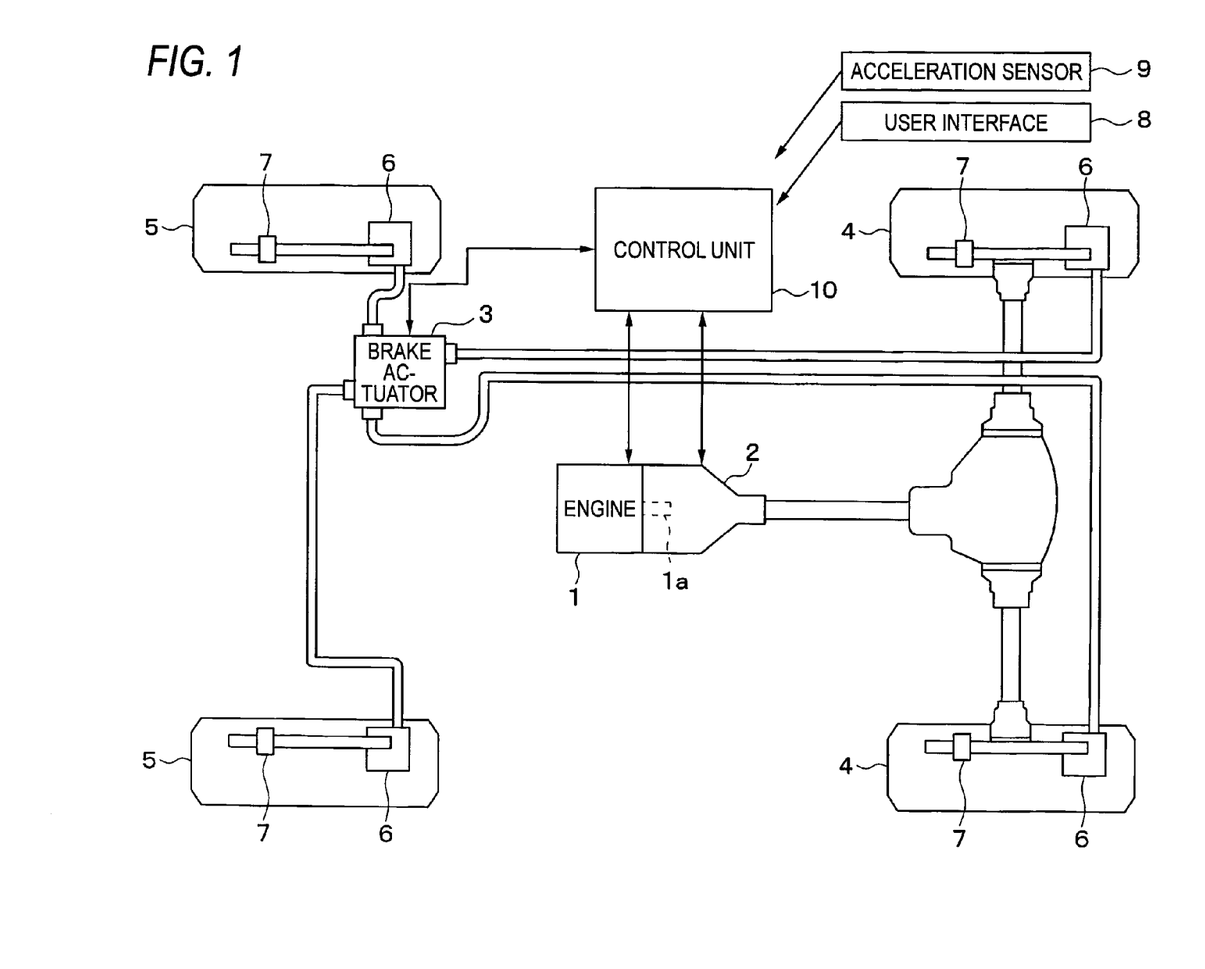
FIG. 1 shows a whole configuration of a braking/driving control cooperation system for a vehicle according to an illustrative embodiment of the present invention.

Hereinafter, a braking/driving cooperation system for a vehicle according to an illustrative embodiment of the present invention will be described. FIG. 1 shows a whole configuration of a braking/driving cooperation system for a vehicle. The braking/driving cooperation system for a vehicle has an engine 1, which is a gasoline internal combustion engine, an automatic transmission 2, a brake actuator 3, wheel cylinders 6 and wheel speed sensors 7 mounted for wheels 4, 5, respectively, a user interface 8, an acceleration sensor 9, a control unit 10 and the like.

A crankshaft 1a of the engine 1 is connected with the automatic transmission 2. Rotating force of the crankshaft 1a is varied by the automatic transmission 2 and is then transmitted to the driving wheels 4. Engine torque of the engine 1 and a gear ratio of the automatic transmission 2 are controlled by the control unit 10.

The driving wheels 4 or the driven wheels 5 are applied with braking force by the hydraulically-driven brake actuator 3. The brake actuator 3 is an apparatus that regulates pressure (wheel cylinder pressure) of hydraulic oil supplied to the wheel cylinders 6 of the respective wheels (respective driving wheels 4 and driven wheels 5) according to the control of the control unit 10. Specifically, the brake actuator 3 regulates the wheel cylinder pressure so as to achieve a required brake pressure Pmc that is received from the control unit 10.

In addition, the respective driving wheels 4 and the driven wheels 5 are mounted with the wheel speed sensors 7 that detect the rotating speeds of the wheels, respectively. Further, the vehicle is mounted with the user interface 8 and the acceleration sensor 9.

The wheel speed sensors 7 are apparatuses that output detection signals according to the rotating speeds of the wheels 4, 5. The control unit 10 (more specifically, a power train axle torque realizing unit 124 of a power train ECU 12, a brake axle torque realizing unit 134 of a brake ECU 13, and a target acceleration setting unit 144 and a braking/driving cooperation control unit 145 of a driving support ECU 14, which will be described later) having received the detection signals from the respective wheel speed sensors 7 calculates a vehicle speed based on the received detection signals. For example, the control unit calculates a mean value of the speeds of the respective wheels 4, 5, as the vehicle speed. The vehicle speed calculated in this manner is considered as an actual speed of the vehicle.

The user interface 8 includes an automatic driving instruction switch, with which a user requests an automatic driving of the vehicle, an accelerator operating member, with which the user instructs the engine 1 to increase the torque, a brake operating member, with which the user instructs braking force by the respective wheel cylinders 6, and the like.

The acceleration sensor 9 is a sensor that detects acceleration based on force applied to the sensor (inertia force accompanied with acceleration of the vehicle). The acceleration sensor 9 also detects gravity that is applied to the sensor. As the acceleration sensor 9, a pendulum-type acceleration sensor or a strain gauge-type acceleration sensor may be used.

The control unit 10 controls driving states (braking and driving) of the vehicle. Specifically, the control unit 10 receives the detection signals of the various sensors detecting the driving states of the engine 1 and the operating states of the automatic transmission 2, the output signals of the user interface 8 and the detection signals of the respective wheel speed sensors 7 and the acceleration sensor 9, and controls the braking/driving of the vehicle based on the received signals. In addition, when the request for automatic driving is input from the user through the user interface 8, the control unit 10 controls the vehicle so that the vehicle drives with a target acceleration.

Figure 2:
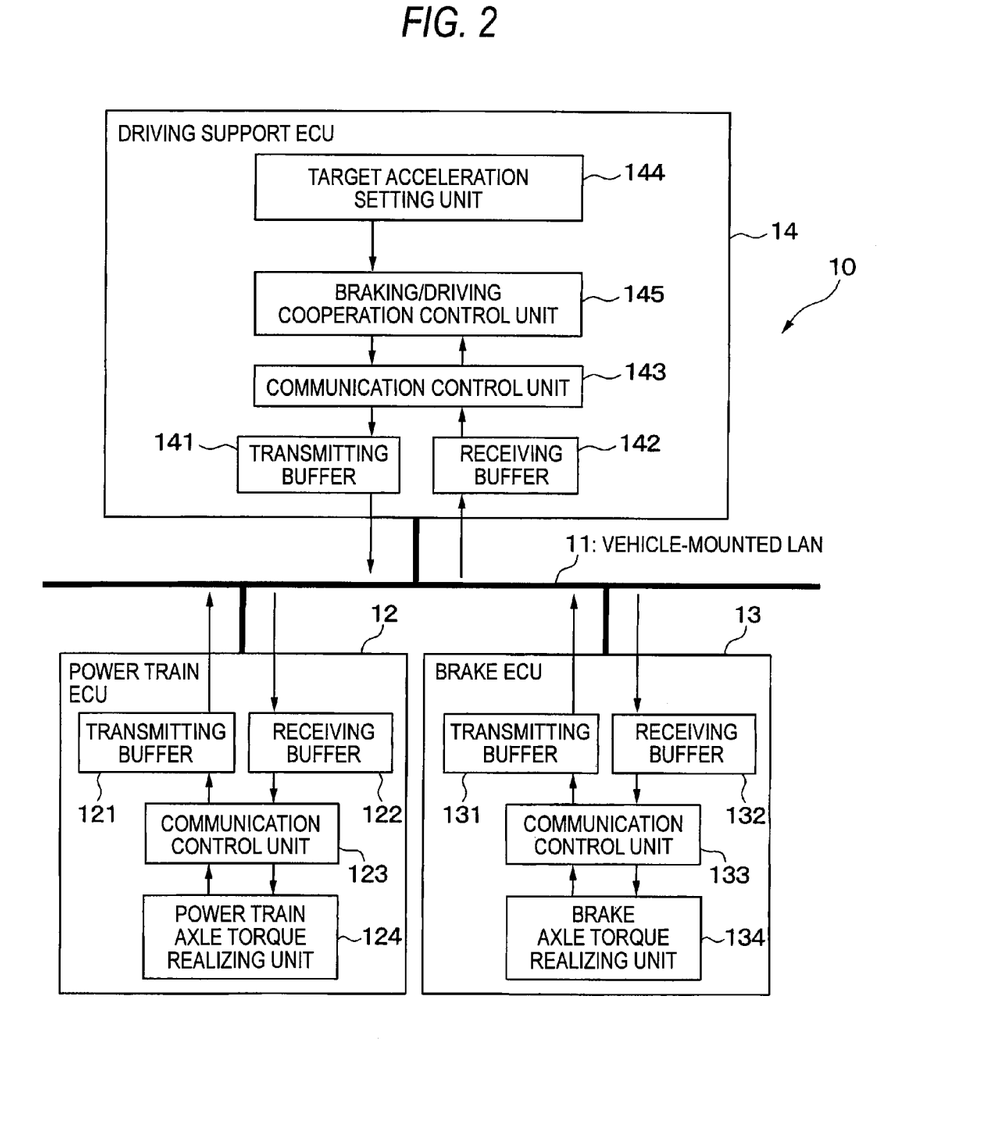
FIG. 2 shows a configuration of a control unit 10.

FIG. 2 shows a configuration of the control unit 10. The control unit 10 has a vehicle-mounted LAN 11 (CAN, LIN and the like) and a power train ECU 12, a brake ECU 13 and a driving support ECU 14, which can perfume communication with each other via the vehicle-mounted LAN 11.

The power train ECU 12 has a transmitting buffer 121, a receiving buffer 122 and a communication control unit 123, which perform communication with the driving support ECU 14 and the like via the vehicle-mounted LAN 11. The power train ECU 12 also has a power train axle torque realizing unit 124.

The power train axle torque realizing unit 124 can be configured by a micro controller, receives a required power train axle torque (axle torque required for a power train) from the driving support ECU 14 via the vehicle-mounted LAN 11 and outputs a required value of a torque for the engine 1 (required engine torque Te) and a required value of a gear ratio for the automatic transmission 2 (required gear ratio Gr), according to the received required power train axle torque. The engine torque of the engine 1 and the gear ratio of the automatic transmission 2 are determined according to the required engine torque Te and the required gear ratio Gr. Accordingly, the power train axle torque realizing unit 124 performs control such that a power train (power transmitting/driving system including the engine 1 and the automatic transmission 2) of the vehicle generates the same axle torque as the required power train axle torque.

The power train axle torque realizing unit 124 uses the transmitting buffer 121, the receiving buffer 122 and the communication control unit 123 so as to perform communication via the vehicle-mounted LAN 11.

The brake ECU 13 has a transmitting buffer 131, a receiving buffer 132 and a communication control unit 133, which perform communication with the driving support ECU 14 and the like via the vehicle-mounted LAN 11. The brake ECU 13 also has a brake axle torque realizing unit 134.

The brake axle torque realizing unit 134 can be configured by a micro controller, receives a required brake axle torque (axle torque required for a brake) from the driving support ECU 14 via the vehicle-mounted LAN 11 and outputs a required value (required brake pressure Pmc) of the wheel cylinder pressure (brake pressure) to the brake actuator 3, based on the received required brake axle torque. The brake actuator 3 is operated such that the wheel cylinder pressure of each wheel cylinder 6 reaches the required brake pressure Pmc received from the brake axle torque realizing unit 134. Accordingly, the brake axle torque realizing unit 134 performs control such that a braking apparatus (brake actuator 3 and wheel cylinders 6) of the vehicle generates the brake pressure according to the required brake axle torque. Specifically, when the required brake axle torque has a negative value, as the required brake axle torque becomes smaller (has a negative value and the absolute value thereof becomes larger), the higher brake pressure is generated.

In the meantime, the brake axle torque realizing unit 134 uses the transmitting buffer 131, the receiving buffer 132 and the communication control unit 133 so as to perform communication via the vehicle-mounted LAN 11.

The driving support ECU 14 has a transmitting buffer 141, a receiving buffer 142 and a communication control unit 143, which perform communication with the power train ECU 12, the brake ECU 13 and the like via the vehicle-mounted LAN 11. The driving support ECU 14 also has a target acceleration setting unit 144 and a braking/driving cooperation control unit 145.

The target acceleration setting unit 144 and the braking/driving cooperation control unit 145 may be separately implemented by a micro computer or may be integrally implemented by one micro computer. The target acceleration setting unit 144 and the braking/driving cooperation control unit 145 uses the transmitting buffer 141, the receiving buffer 142 and the communication control unit 143 so as to perform communication via the vehicle-mounted LAN 11.

The target acceleration setting unit 144 sets, as an acceleration of the vehicle to be achieved (should be achieved), a target acceleration, every predetermined control period and outputs the set target acceleration to the braking/driving cooperation control unit 145. As the method of determining a target acceleration, a following method is adopted, for example.

When a user pushes the automatic driving instruction switch of the user interface 8 to request the automatic driving of the vehicle, the target acceleration setting unit executes a variety of applications for automatic driving, thereby determining target accelerations, respectively.

The applications for automatic driving include an application for cruise control, an application for vehicle interval control and an application for pre-crash control. The cruise control is to make driving speed of a vehicle constant. The vehicle interval control is to maintain a vehicle interval with a front vehicle at a predetermined interval. The pre-crash control is to decelerate a vehicle so as to absorb shock at collision with a front vehicle.

When the applications for the automatic driving are executed, an adjustment control is executed. In the adjustment control, the target acceleration setting unit 144 determines one target acceleration, based on the target accelerations individually determined by the cruise control, the vehicle interval control and the pre-crash control, and outputs the determined target acceleration to the braking/driving cooperation control unit 145.

The braking/driving cooperation control unit 145 calculates, every predetermined period, the required power train axle torque and the required brake axle torque by two-freedom (independent) control of feed-forward control and feedback control in accordance with the target acceleration received from the target acceleration setting unit 144 and transmits the calculated required power train axle torque to the power train ECU 12 via the vehicle-mounted LAN 11 and transmits calculated required brake axle torque to the brake ECU 13 via the vehicle-mounted LAN 11.

Figure 3:
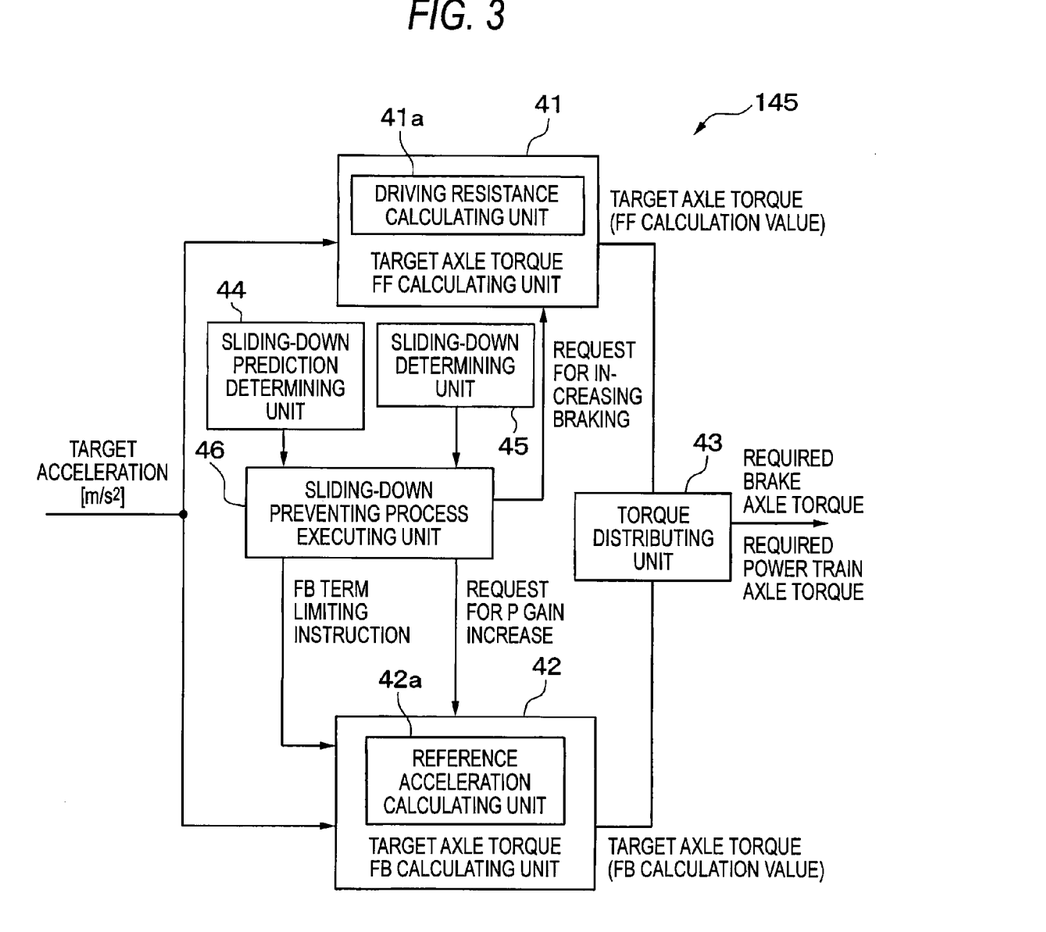
FIG. 3 shows a functional configuration of a braking/driving cooperation control unit 145.

FIG. 3 shows a functional configuration of the braking/driving cooperation control unit 145. The functions of the braking/driving cooperation control unit 145 are divided into a target axle torque FF calculating unit 41, a target axle torque FB calculating unit 42, a torque distributing unit 43, a sliding-down prediction determining unit 44, a sliding-down determining unit 45 and a sliding-down preventing process executing unit 46. The respective units 41 to 46 may be separately and individually implemented by six programs that are executed in parallel at the same time, or may be respectively implemented by six ICs in the braking/driving cooperation control unit 145.

The target axle torque FF calculating unit 41 and the target axle torque FB calculating unit 42 perform the feed-forward calculation and the feedback calculation so as to achieve the target acceleration, respectively. The target axle torque FF calculating unit 41 calculates and outputs a feed-forward (FF) calculation value of the target axle torque, and the target axle torque FB calculating unit 42 calculates and outputs a feedback (FB) calculation value of the target axle torque. The torque distributing unit 43 calculates, as a target axle torque, a sum of the FF calculation value and FB calculation value of the target axle torque, and distributes the target axle torque to the required power train axle torque and the required brake axle torque.

First, the target axle torque FF calculating unit 41 is specifically described. The target axle torque FF calculating unit 41 includes a driving resistance calculating unit 41a that calculates a driving resistance of a vehicle. The target axle torque FF calculating unit 41 calculates force Fff obtained by adding reference force (which is a value obtained by multiplying the target acceleration by a preset vehicle weight M) to the calculated driving resistance and obtains an FF calculation value of the target axle torque (hereinafter, referred to as FF target axle torque) by multiplying the calculated force Fff by a radius r (which is preset) of the driving wheel 4. In other words, the FF target axle torque corresponds to an estimated value of an axle torque which is necessary for the vehicle to achieve the target acceleration against the driving resistance.

The driving resistance calculated by the driving resistance calculating unit 41a is a force that includes three effects, that is, air resistance, rolling resistance, and gravity and is applied to a rear side of the vehicle. The air resistance is a force that is applied in an opposite direction to a driving direction by air when a vehicle drives. The air resistance is calculated on the basis of the square of actual vehicle speed V, an air density $\rho$, a coefficient Cd and a front projected area S of a vehicle. Rolling resistance is resistive force that is caused by frictions between a road surface and the driving wheels 4 and between the road surface and the driven wheels 5. The rolling resistance is calculated on the basis of a frictional coefficient $\mu$ when an object rolls, a vehicle weight M, the acceleration of gravity g and a road gradient $\theta$. In addition, the resistance by gravity indicates gravity that is applied in a rearward direction of a vehicle's driving direction along the road gradient $\theta$ when a road is inclined. The resistance by gravity is an amount that can be expressed by $M \cdot g \cdot \sin \theta$ using the road gradient $\theta$. In the meantime, the road gradient $\theta$ is an angle that is estimated from an actual acceleration, which is a differential value of the actual vehicle speed V obtainable from the detection signals of the wheel speed sensors 7, and the detection signal of the acceleration sensor 9. When a road is parallel with a driving direction, the road gradient is zero ($\theta$=0). When a road is an uphill road with respect to the driving direction, the road gradient is greater than zero ($\theta$>0). When a road is a downhill road with respect to the driving direction, the road gradient is smaller than zero ($\theta$<0).

It is noted that when the calculated FF target axle torque has a negative value, the target axle torque FF calculating unit 41 does not output the calculated FF target axle torque as it is, but outputs, as an FF target axle torque, a result that is obtained by correcting the calculated FF target axle torque by sliding mode control. In the below, the FF target axle torque before the correction by the sliding mode control is referred to as 'reference FF target axle torque.'

In the correction by the sliding mode control, a stop time at which a vehicle stops is predicted, and a change in axle torque is assumed in which the FF target axle torque approximates to the reference FF target axle torque as the time goes by and reaches the reference FF target axle torque at the predicted stop time. More specifically, the change in axle torque is such a change that the FF target axle torque gradually changes from one before control period than the present, approximates to the reference FF target axle torque and reaches the reference FF target axle torque at the stop time. Then, the current FF target axle torque is corrected with a value resulting from the above change in axle torque.

For example, when it is assumed that a current time is t1, a predicted stop time is t2, an FF target axle torque, which is output at one before control period than the present, is TQ0, a current reference FF target axle torque is TQt and a control period is td, an FF target axle torque TQ1 that should be output at this time is calculated by a following equation.

$$TQ1=TQ0+td \times (TQt-TQ0)/(t2-t1+\Delta t)$$

It is noted that there is an exceptional case where the reference FF target axle torque is intentionally reduced from an estimated value of an axle torque necessary for a vehicle to achieve the target acceleration against the driving resistance. Specifically, while the target axle torque FF calculating unit 41 is receiving a request for increasing braking (which will be described later) from the sliding-down preventing process executing unit 46, the target axle torque FF calculating unit 41 keeps to perform a process of reducing the reference FF target axle torque by a predetermined amount aT from the 'estimated value of an axle torque necessary for the vehicle to achieve the target acceleration against the driving resistance.'

Next, the target axle torque FB calculation unit 42 is specifically described. The target axle torque FB calculation unit 42 has a reference acceleration calculating unit 42a. The reference acceleration calculating unit 42a converts the target acceleration by a reference model, thereby calculating a reference acceleration.

The target axle torque FB calculation unit 42 calculates an FB calculation value of the target axle torque by a feedback calculation based on the reference acceleration, which is calculated by the reference acceleration calculating unit 42a, and the actual acceleration of the vehicle (time differential of actual vehicle speed).

Specifically, the target axle torque FB calculation unit calculates a time differential of the actual vehicle speed V (i.e., actual acceleration), based on the detection signals of the respective wheel speed sensors 7 and performs a low-pass filter process for the actual acceleration, thereby removing high frequency components (noise components) in the actual acceleration. The actual acceleration from which the noise has been removed is referred to as a first input.

On the other hand, the target axle torque FB calculation unit performs the low-pass filter process for the reference acceleration calculated by the reference acceleration calculating unit 42a, a result of which is referred to as a second input.

The target axle torque FB calculation unit 42 calculates a difference (deviation err) between the first input and the second input. The difference is a past value by a delay amount in the low-pass filter process for the difference of the reference acceleration from the actual acceleration.

The target axle torque FB calculation unit 42 performs a PI control for feedback control of the first input to the second input. More specifically, the target axle torque FB calculation unit calculates an integrated value Ten based on the deviation err. In other words, the target axle torque FB calculation unit adds a value, which is obtained by multiplying the control period td of the braking/driving cooperation control unit 145 by the deviation err of this time, to an integrated value Ierr0 of previous time, thereby calculating an integrated value Ierr of this time. Consecutively, the target axle torque FB calculation unit calculates an FB calculation value of the target axle torque. In other words, the target axle torque FB calculation unit calculates, as an FB calculation value of the target axle torque, a sum (i.e., an operating amount in the feedback control) of a value, which is obtained by multiplying a proportional gain Kp (which corresponds to a P gain in the PI control) by the deviation err, and a value, which is obtained by multiplying an integral gain Ki by the integrated value Ierr. In other words, the FB calculation value of the target axle torque is torque that is required so as to match the actual acceleration to the reference acceleration. By the above configuration, the proportional gain Kp corresponds to a proportional gain of a term of a proportional control in the feedback control. It is noted that after calculating the FB calculation value of the target axle torque, the target axle torque FB calculation unit stores the deviation err, as the deviation err0 of previous time, and stores the integrated value Ierr, as the integrated value Ierr0 of previous time.

It is noted that, in a specific case, the target axle torque FB calculation unit 42 is adapted to keep the FB calculation value of the target axle torque smaller than the result of the PI control. Specifically, the target axle torque FB calculation unit 42 suppresses the upper limit of the FB calculation value of the target axle torque to zero so that the FB calculation value of the target axle torque becomes not a positive value only while the target axle torque FB calculation unit 42 is receiving an FB term limiting instruction from the sliding-down preventing process executing unit 46 (which will be described later), thereby limiting an increase in the FB calculation value of the target axle torque. More specifically, when the FB calculation value of the target axle torque, which is the result of the PI control, is a positive value, the target axle torque FB calculation unit 42 corrects the corresponding value into zero and outputs the corrected value. When the FB calculation value of the target axle torque, which is the result of the PI control, is a negative value, the target axle torque FB calculation unit outputs the value as it is.

In this illustrative embodiment, the value of the integral gain Ki is constant and the proportional gain Kp (which is a positive value) is also a constant default value. However, in an exceptional case, the value of the proportional gain Kp may be increased. Specifically, only while the target axle torque FB calculation unit 42 is receiving a request for P gain increase from the sliding-down preventing process executing unit 46 (which will be described later), the target axle torque FB calculation unit increases the value of the proportional gain Kp by a predetermined amount $\alpha P$, from the above default value.

Next, the torque distributing unit 43 is specifically described. The torque distributing unit 43 calculates, as the target axle torque, a sum of the FF calculation value of the target axle torque which is output from the target axle torque FF calculating unit 41, and the FB calculation value of the target axle torque which is output from the target axle torque FB calculating unit 42.

Then, the torque distributing unit 43 divides (distributes) the target axle torque to the required power train axle torque and the required brake axle torque. Specifically, the torque distributing unit determines whether the target axle torque is an achievable minimum power train torque Tptmin or greater. This process is to determine whether the target axle torque can be generated only by the power train. Here, the achievable minimum power train torque Tptmin is a minimum torque that can be achieved by the engine 1 and the automatic transmission 2.

When the target axle torque is the achievable minimum power train torque Tptmin or greater, the torque distributing unit determines that the target axle torque can be achieved only by the power train, uses the target axle torque as the required power train axle torque and makes the required brake axle torque zero.

When the target axle torque is below the achievable minimum power train torque Tptmin, the torque distributing unit determines that the target axle torque cannot be achieved only by the power train, uses the achievable minimum power train torque Tptmin as the required power train axle torque, and sets, as the required brake axle torque, a value obtained by subtracting the achievable minimum power train torque Tptmin from the target axle torque.

Then, the torque distributing unit 43 transmits the required power train axle torque and the required brake axle torque, which are calculated as described above, to the power train ECU 12 and the brake ECU 13 by using the communication control unit 143, respectively.

In the below, the sliding-down prediction determining unit 44, the sliding-down determining unit 45 and the sliding-down preventing process executing unit 46 are described. First, while the vehicle decelerates, the sliding-down prediction determining unit 44 determines, every control period, whether there is a possibility that the vehicle slides down rearwards on an uphill road. Until it is determined that 'there is a possibility that the vehicle slides down rearwards on an uphill road,' the sliding-down prediction determining unit 44 keeps a sliding-down prediction determining flag in a storage medium such as RAM at an off state. When it is determined that 'there is a possibility that the vehicle slides down rearwards on an uphill road,' the sliding-down prediction determining unit 44 switches the sliding-down prediction determining flag from the off state to an on state. After switching the sliding-down prediction determining flag from the off state to the on state, the sliding-down prediction determining unit 44 keeps the sliding-down prediction determining flag at the on state until first ending time, irrespective of a result of determining whether 'there is a possibility that the vehicle slides down rearwards on an uphill road.'

The first ending time may be a point of time at which predetermined time (for example, 10 seconds) has elapsed after switching the sliding-down prediction determining flag into the on state, may be a point of time at which the actual speed of the vehicle becomes zero, or may be a point of time at which predetermined time (for example, 1 second) has elapsed after the actual speed of the vehicle becomes zero. In addition, when the road gradient θ becomes a negative value (which indicates a downhill road) while the actual vehicle speed becomes not zero, any point of time thereafter may be employed as the first ending time.

Whether there is a possibility that the vehicle slides down rearwards on an uphill road may be determined when a condition is satisfied, in which the vehicle speed is in a very slow speed range and the braking torque is not required for the actuator even though the vehicle decelerates. That is, if the condition is satisfied, the sliding-down prediction determination may be ON, and if the condition is not satisfied, the sliding-down prediction determination may be OFF.

In the above condition, whether the vehicle speed is in the very slow speed range may be determined based on whether the actual vehicle speed is below a predetermined threshold speed. The threshold speed value may be a constant (for example, 10 km/h). However, the threshold speed value may be increased as an actual deceleration of a vehicle (which corresponds to an amount having an inverted sign of the actual acceleration) is increased, because a timing at which the sliding-down of a vehicle occurs tends to be earlier as the actual deceleration is increased.

In addition, whether the braking torque is not required for the actuator is determined based on whether the required brake axle torque, which is output from the torque distributing unit 43, has a negative value.

Also, regarding the method of determining whether there is a possibility that the vehicle slides down rearwards on an uphill road, the determination may be made based on whether a condition that a vehicle drives on an uphill road is satisfied, for example, and the other methods may be used for the determination.

The sliding-down determining unit 45 determines, every control period, whether the vehicle actually slides down. Only while it is determined that 'the vehicle actually slides down,' the sliding-down determining unit sets a sliding-down determining flag in a storage medium such as RAM ON. When it is not determined that 'the vehicle actually slides down,' the sliding-down determining unit sets the sliding-down determining flag OFF. Whether the vehicle actually slides down may be determined based on whether all values of the wheel speeds detected by the wheel speed sensors 7 are negative or whether a value of the vehicle speed of one specific wheel is negative. In order to reduce a possibility of the sliding-down of the vehicle, the sliding-down preventing process executing unit 46 outputs a request for increasing braking to the target axle torque FF calculating unit 41, the FB term limiting instruction to the target axle torque FB calculating unit 42 and a request for P gain increase to the target axle torque FB calculating unit 42, as required, based on the sliding-down prediction determining flag and the sliding-down determining flag, which are the determination results of the sliding-down prediction determining unit 44 and the sliding-down determining unit 45.

Figure 4:
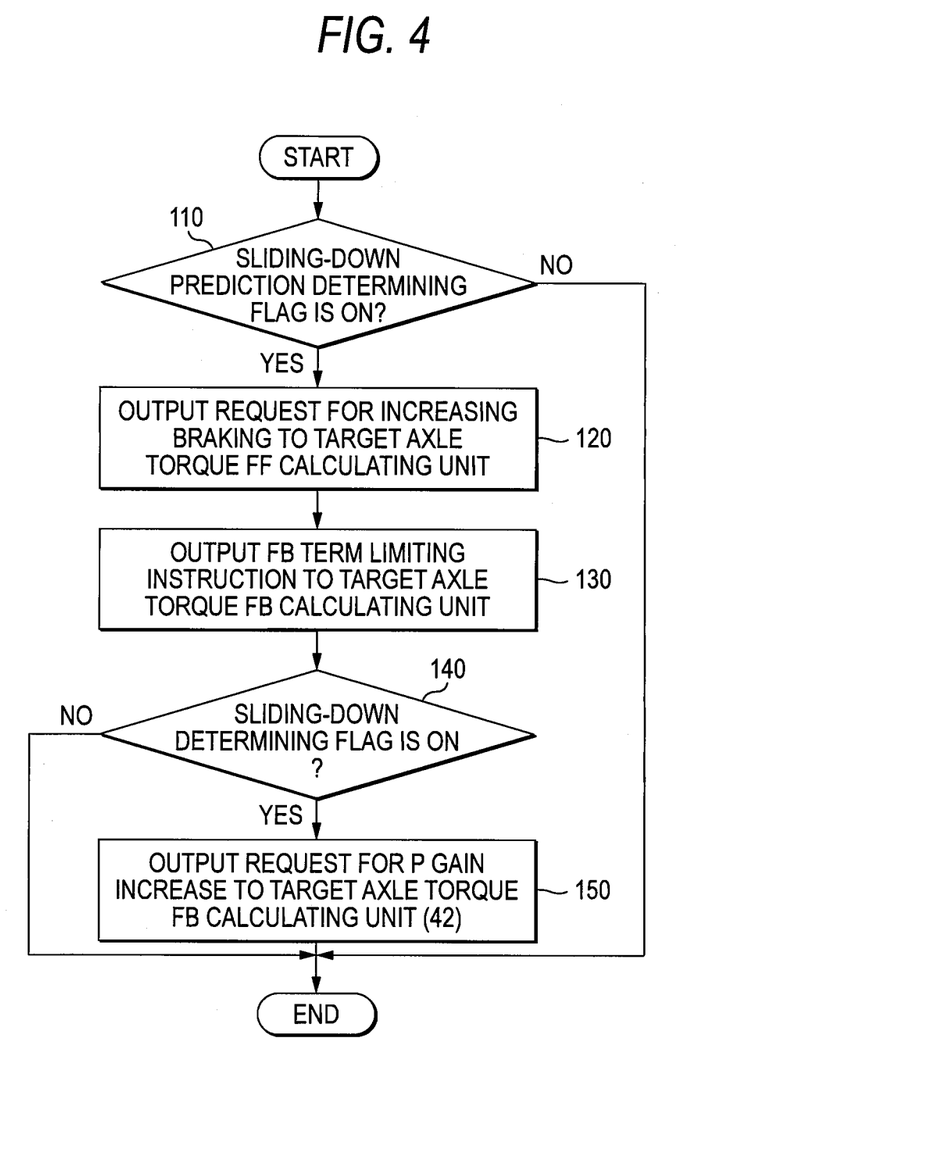
FIG. 4 is a flow chart showing a process of a sliding-down preventing process executing unit 46.

FIG. 4 is a flow chart showing a process of the sliding-down preventing process executing unit 46. The sliding-down preventing process executing unit 46 executes the process of FIG. 4 one time, every control period.

As shown in FIG. 4, in step 110, the sliding-down preventing process executing unit 46 determines whether the sliding-down prediction determining flag is ON. When the flag is ON, the process proceeds to step 120. When the flag is OFF, the process of FIG. 4 ends.

In step 120, the sliding-down preventing process executing unit 46 outputs a request for increasing braking to the target axle torque FF calculating unit 41. In step 130, the sliding-down preventing process executing unit 46 outputs an FB term limiting instruction to the target axle torque FB calculating unit 42.

In step 140, the sliding-down preventing process executing unit determines whether the sliding-down determining flag is ON. When the flag is ON, the proceeds to step 150. When the flag is OFF, the process of FIG. 4 ends. In step 150, the sliding-down preventing process executing unit 46 outputs a request for P gain increase to the target axle torque FB calculating unit 42 and then ends the process of FIG. 4.

Figure 5:
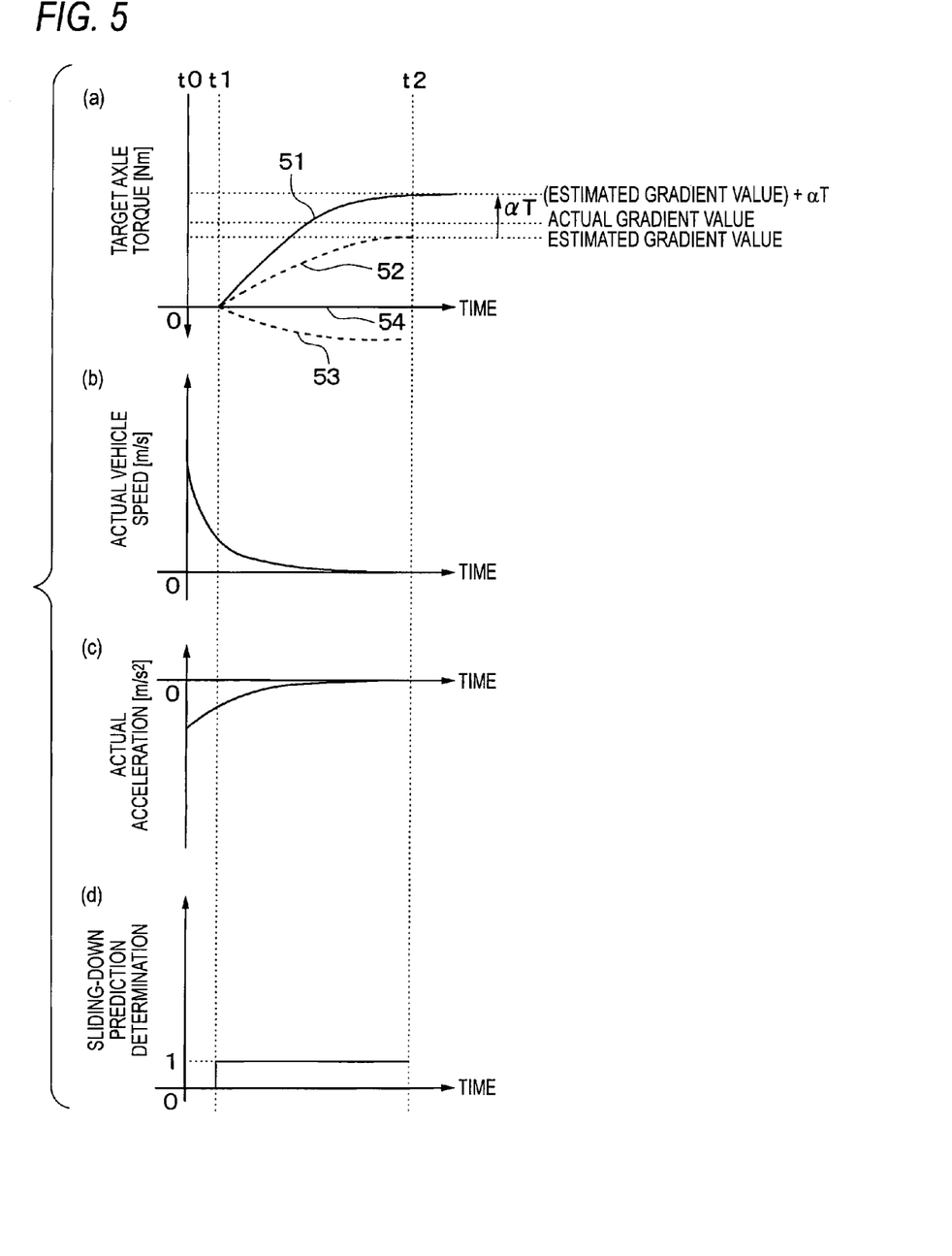
FIG. 5 is an exemplary timing chart when sliding-down does not occur.

An exemplary operation of the braking/driving cooperation system configured and operated as described above is described with reference to timing charts of FIGS. 5 and 6. FIG. 5 shows a case where the vehicle stops on an uphill road without sliding down, in which the horizontal axis of (a) to (d) of FIG. 5 indicates a time axis. A vertical axis of (a) of FIG. 5 indicates the target axle torque, a vertical axis of (b) of FIG. 5 indicates the actual vehicle speed, a vertical axis of (c) of FIG. 5 indicates the actual acceleration and a vertical axis of (d) of FIG. 5 indicates the sliding-down prediction determining flag in which a value of 1 indicates ON and a value of zero (0) indicates OFF.

Among (a) to (d) of FIG. 5, an increase direction thereof is downward only in the target axle torque of the vertical axis in (a). In addition, a value, which is actually indicated as an FF calculation value 51 of the target axle torque, is a value of only a term, which depends on the driving resistance of the target acceleration and the driving resistance of the FF calculation value 51 of the target axle torque, for simplification.

First, during the period from time t0 to t1, the sliding-down prediction determining flag and the sliding-down determining flag are OFF. In addition, although the actual vehicle speed is decreased, the FF calculation value 51 of the target axle torque and the FB calculation value 52 of the target axle torque are zero (or larger than zero), due to the relation between the gradient of the uphill road and the target acceleration. In other words, the vehicle decelerates by the driving resistance due to the road gradient and the like, not by the driving force by the brake actuator 3. In the above period, since the sliding-down preventing process executing unit 46 determines in step 110 of FIG. 4 that the sliding-down prediction determining flag is OFF and ends the process, all of the request for increasing braking, the FB term limiting instruction and the request for P gain increase are not output.

At time t1, the actual vehicle speeds enters the very slow speed range. Then, the sliding-down preventing process executing unit 46 determines in step 110 that the sliding-down prediction determining flag is ON, starts to output a request for increasing braking to the target axle torque FF calculating unit 41 and an FB term limiting instruction to the target axle torque FB calculating unit 42 in step 120. However, since the sliding-down does not occur at this time, the sliding-down preventing process executing unit 46 determines in step 140 that the sliding-down determining flag is OFF. Accordingly, the sliding-down preventing process executing unit 64 does not output a request for P gain increase.

The target axle torque FF calculating unit 41 having received the request for increasing braking starts to calculate the reference FF target axle torque, as a value that is obtained by reducing the reference FF target axle torque by a predetermined amount $\alpha T$ from the 'estimated value of axle torque necessary for the vehicle to achieve the target acceleration against the driving resistance.'

Then, the FF target axle torque 51 after time t1 is gradually reduced and thus approximates to the reference FF target axle torque by the above-described sliding mode control, as time goes by. In the meantime, the reference FF target axle torque itself is also changed as time passes.

While the FF target axle torque 51 is reduced to approximate to the reference FF target axle torque that has been reduced by the predetermined amount $\alpha T$, the value of the FF target axle torque 51 at each point of time is smaller, compared to the FF target axle torque 52 of when it is assumed that the reference FF target axle torque has not been reduced by the predetermined amount $\alpha T$ at the same point of time. Accordingly, the vehicle quickly decelerates, as the corresponding difference.

In addition, as described above, when the FB calculation value of the target axle torque, which is a result of the PI control, is a positive value, the target axle torque FB calculating unit 42 having received the FB term limiting instruction at time t1 corrects the FB calculation value of the target axle torque with zero and then outputs the same. When the FB calculation value of the target axle torque, which is a result of the PI control, is a negative value, the target axle torque FB calculating unit outputs the value itself.

If the control of lowering the FB calculation value is not made, since the FF target axle torque 51 is set to be smaller than the value for achieving the target acceleration against the driving resistance, as described above, the FB calculation value 53 of the target axle torque is increased so as to remove the corresponding difference and thus becomes a positive value. As a result, the reduction effect of the predetermined amount $\alpha T$ in the target axle torque FF calculation unit 41 is substantially canceled.

However, according to this illustrative embodiment, the FB calculation value 54 of the target axle torque is suppressed to be lower than the result of the PI control, so that the value is made to be zero from the positive value. Accordingly, the increase in the FB calculation value of the target axle torque is limited, so that the reduction effect of the predetermined amount $\alpha T$ in the target axle torque FF calculation unit 41 is prevented from being canceled. Furthermore, it is possible to maintain the effect of reducing the possibility that the vehicle slides down.

In addition, when the FF target axle torque 51 is gradually reduced, the required brake axle torque becomes a negative value from zero at certain time, so that the braking force by the brake actuator 3 starts to act. After that, the FF target axle torque 51 is reduced and the braking force by the brake actuator 3 is increased.

Also, the actual deceleration is gradually decreased. This is because the target acceleration setting unit 144 gradually approximates the target acceleration, which has a negative value, to zero toward the vehicle stop time so as to prevent the nose dive and swing back of the vehicle.

At time t2 at which the vehicle finally stops, the FF target axle torque 51 reaches the reference FF target axle torque (which has been reduced by the predetermined amount $\alpha T$) at that time.

As described above, the road gradient $\theta$ is estimated based on the detection values of the wheel speed sensors 7 and the detection value of the acceleration sensor 9. For example, regarding the wheel speed that can be detected by the wheel speed sensors 7, there is a detection limit vehicle speed. When vehicle speed is below the detection limit vehicle speed, the wheel speed sensors 7 cannot accurately detect the vehicle speed. Accordingly, an error of the road gradient $\theta$ is increased around the detection limit vehicle speed. In addition, since a G sensor is influenced by a vehicle pitching and the vehicle pitching is caused just before the vehicle stops, an error of the road gradient $\theta$ is increased.

In this case, even though the value, which is estimated as an estimated value of the axle torque necessary for the vehicle to achieve the target acceleration against the driving resistance, becomes a value (a value at which the braking torque is insufficient) larger than the axle torque, which is required in correspondence to the actual gradient, due to the influence of the detection error of the road gradient $\theta$, since the reference FF target axle torque has been reduced by the predetermined amount $\alpha T$, compared to the estimated value, a possibility that the FF target axle torque 51 achieve a value (at which the braking torque is sufficient) smaller than the estimated value of the axle torque, which is required in correspondence to the actual gradient, is increased, as shown in (a) of FIG. 5.

Figure 6:
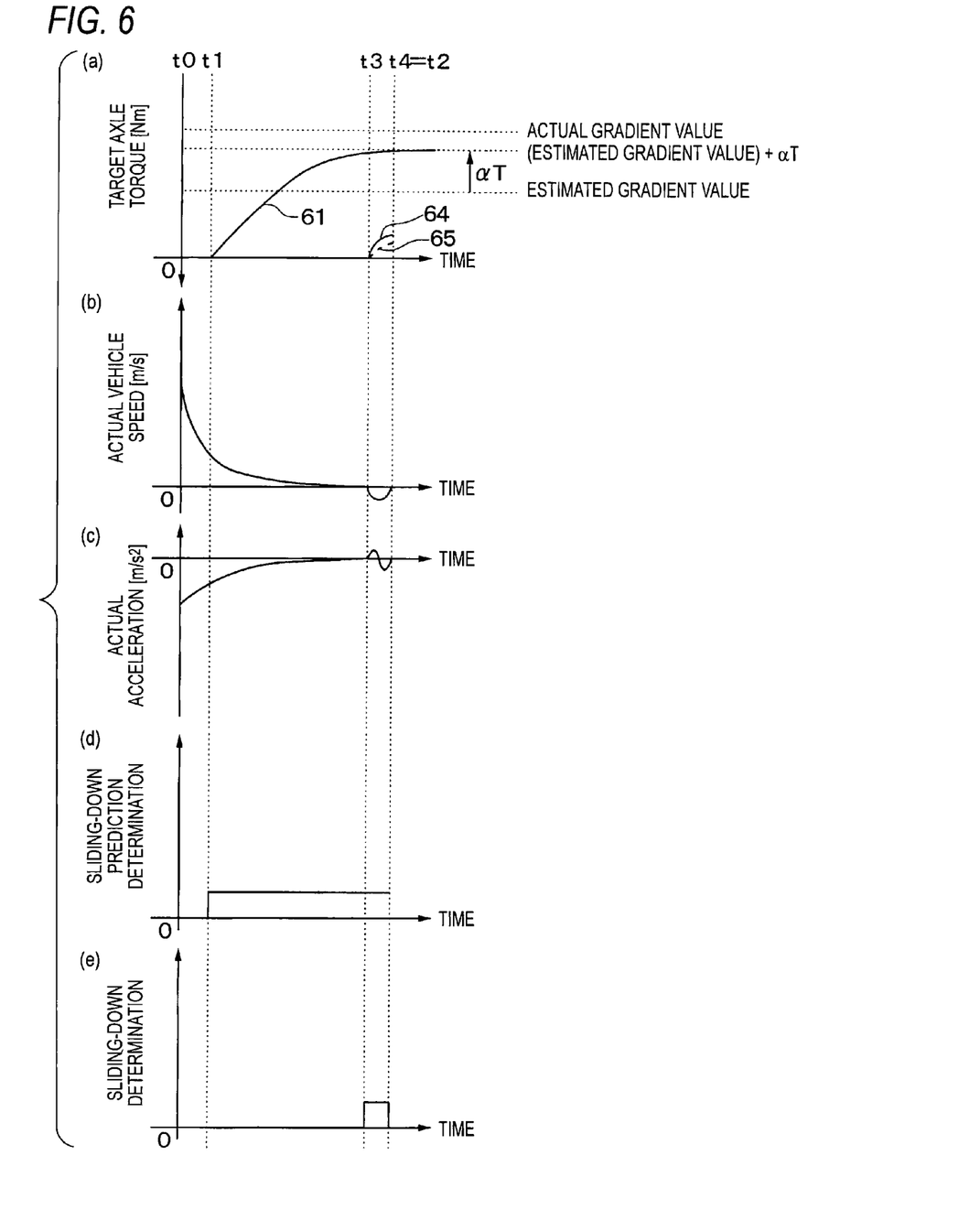
FIG. 6 is an exemplary timing chart when sliding-down occurs.

FIG. 6 shows a case where even when the FF target axle torque is reduced as this illustrative embodiment, the detection error of the road gradient $\theta$ is not made up for, so that the vehicle slides down just before it stops on the uphill road. The amounts shown in (a) to (d) of FIG. 6 are the same as those of (a) to (d) of FIG. 5. In (e) of FIG. 6, a vertical axis indicates the sliding-down determining flag in which a value of 1 indicates ON and a value of zero (0) indicates OFF.

Also in this case, the operations from time t0 to time t1 and until the sliding-down occurs after the time t1 are the same as the case of FIG. 5. However, in FIG. 6, the difference between the estimated road gradient $\theta$ and the actual road gradient is larger than that of FIG. 5. As a result, the sliding-down occurs even at the reference FF target axle torque that has been reduced by the predetermined amount $\alpha T$.

At time t3, even though the target acceleration is almost zero, the vehicle speed is generated rearwards due to the sliding-down, so that a deviation between the actual acceleration and the reference acceleration is caused in the target axle torque FB calculating unit 42. At this time, the proportional gain Kp is increased, compared to the typical proportional gain, so that the responsiveness of an FB calculation value 64 of the target axle torque is improved, compared to an FB calculation value 65 of the target axle torque when the proportional gain Kp has the normal value. As a result, it is possible to solve the sliding-down more quickly. In other words, by increasing the proportional gain Kp of the feedback control in the target axle torque FB calculating unit 42, it is possible to improve a following capability of the actual acceleration to the target acceleration, so that the sliding-down can be suppressed to the minimum.

As described above, in the course where the vehicle drives and then stops, the sliding-down preventing process executing unit 46 controls the target axle torque FF calculating unit 41, until the sliding-down prediction determining unit 44 determines that there is a possibility that the vehicle slides down rearwards on the uphill road (until time t1), to calculate and output the feed-forward calculation value of the target axle torque so as to reach the estimated value of axle torque necessary for the vehicle to achieve the target acceleration against the driving resistance. In addition, after the sliding-down prediction determining unit 44 determines that there is a possibility that the vehicle slides down rearwards on the uphill road, the sliding-down preventing process executing unit 46 controls the target axle torque FF calculating unit 41 to calculate and output the feed-forward calculation value of the target axle torque so as to reach the axle torque, which is obtained by reducing the predetermined amount αT, from the estimated value of axle torque necessary for the vehicle to achieve the target acceleration against the driving resistance, and controls the target axle torque FB calculation unit 42 to limit an increase in the feedback calculation value of the target axle torque so as to prevent effect caused by reduction of the predetermined amount αT in the target axle torque FF calculation unit 41 from being canceled.

Accordingly, when it is determined that there is a possibility that the vehicle slides down rearwards on the uphill road in the braking/driving control cooperation system for a vehicle that calculates the target axle torque by the feed-forward control and the feedback control, the target axle torque is reduced by the predetermined amount αT from the normal case, so that it is possible to reduce the possibility that the vehicle slides down.

In addition, when the vehicle actually slides down, the sliding-down preventing process executing unit 46 increases the value of the proportional gain Kp of the term of the proportional control in the feedback calculation of the target axle torque FF calculating unit 42, based on the determination of the sliding-down determining unit 45. Accordingly, when the sliding-down occurs, the proportional gain Kp of the proportional control is increased, so that it is possible to suppress the degree of the sliding-down to the minimum.

Next, the specific value of the predetermined amount αT of the FF calculation value of the target axle torque is described.

The predetermined amount αT may be a maximum error that is assumed with respect to the estimated value of the axle torque necessary for the vehicle to achieve the target acceleration against the driving resistance. A maximum error of the estimated value can be calculated based on a maximum error of the wheel acceleration that is a differential value of the wheel speed and a maximum error of the vehicle acceleration that is caused due to the vehicle pitching. As the maximum error of the wheel acceleration and the maximum error of the vehicle acceleration, predetermined values may be adopted. In addition, the predetermined amount αT may be changed according to the estimated value of the axle torque necessary for the vehicle to achieve the target acceleration. For example, 0.3 times of an absolute value of the estimated value may be the predetermined amount αT.

In the above illustrative embodiment, the target axle torque FF calculating unit 41, the target axle torque FB calculating unit 42 and the torque distributing unit 43 functions as an example of a basic control unit.

(Other Illustrative Embodiments)

While the present invention has been shown and described with reference to certain illustrative embodiments thereof, it will be understood by those skilled in the art that various changes in form and details may be made therein without departing from the spirit and scope of the invention as defined by the appended claims.

For example, in the above illustrative embodiment, the torque distributing unit 43 calculates the target axle torque based on the result of the feed-forward control of the target axle torque FF calculating unit 41 and the result of the feedback control of the target axle torque FB calculating unit 42. However, the feedback control is not necessarily required. Even in this case, when the sliding-down preventing process executing unit 46 and the torque distributing unit 43 are configured as follows, the effect of reducing the sliding-down is achieved. That is, after the sliding-down prediction determining unit 44 determines that there is a possibility that the vehicle slides down rearwards on the uphill road, the sliding-down preventing process executing unit 46 is configured to control the target axle torque FF calculating unit 41 to calculate and output the FF calculation value of the target axle torque so as to reach the axle torque, which is obtained by reducing the predetermined amount αT from the estimated value of axle torque necessary for the vehicle to achieve the target acceleration against the driving resistance, and the torque distributing unit 43 is configured to adopt the FF calculation value of the target axle torque, which is output from the target axle torque FF calculating unit 41, as the target axle torque.

In the above illustrative embodiment, the PI control is adopted as the feedback calculation of the target axle torque FB calculating unit 42. However, the PID control or P control may be adopted instead of the PI control. In any cases, the value of the proportional gain Kp of the term of the proportional control is increased in the adopted feedback calculation when the sliding-down actually occurs. According to this configuration, it is possible to obtain the same effects as the above illustrative embodiment.

What is claimed is:

1. A braking/driving control apparatus for a vehicle, the apparatus comprising:
   a basic control unit which calculates and outputs a target axle torque based on a target acceleration set as an acceleration of the vehicle to be achieved and a driving resistance of the vehicle including an effect of gravity according to a gradient of a road, and which determines an axle torque to be required for a power train of the vehicle and an axle torque to be required for a braking apparatus of the vehicle based on the calculated target axle torque;
   a sliding-down prediction determining unit which determines whether there is a possibility that the vehicle slides down rearwards on an uphill road, during deceleration of the vehicle; and
   a sliding-down preventing process executing unit which performs a process for reducing a possibility that the vehicle slides down, based on a determination result of the sliding-down prediction determining unit,
   wherein until the sliding-down prediction determining unit determines that there is a possibility that the vehicle slides down rearwards on an uphill road, the sliding-down preventing process executing unit controls the basic control unit to calculate and output the target axle torque so as to reach an estimated value of an axle torque which is necessary for the vehicle to achieve the target acceleration against the driving resistance, and
   wherein after the sliding-down prediction determining unit determines that there is a possibility that the vehicle slides down rearwards on an uphill road, the sliding-down preventing process executing unit controls the basic control unit to calculate and output the target axle torque so as to reach an axle torque which is obtained by reducing a predetermined positive amount form the estimated value of the axle torque necessary for the vehicle to achieve the target acceleration against the driving resistance.

2. The braking/driving control apparatus according to claim 1,
   wherein the basic control unit includes:
   a target axle torque FF calculating unit which calculates and outputs a feed-forward calculation value of the target axle torque based on the target acceleration and the driving resistance of the vehicle;

a target axle torque FB calculating unit which calculates and outputs a feedback calculation value of the target axle torque by feedback calculation based on the target acceleration and an actual acceleration of the vehicle; and a torque distributing unit which determines the axle torque to be required for the power train of the vehicle and the axle torque to be required for the braking apparatus of the vehicle, based on the FF calculation value of the target axle torque output from the target axle torque FF calculating unit and the FB calculation value of the target axle torque output from the target axle torque FB calculating unit, wherein until the sliding-down prediction determining unit determines that there is a possibility that the vehicle slides down rearwards on an uphill road, the sliding-down preventing process executing unit controls the target axle torque FF calculation unit to calculate and output the feed-forward calculation value of the target axle torque so as to reach the estimated value of the axle torque necessary for the vehicle to achieve the target acceleration against the driving resistance, and wherein after the sliding-down prediction determining unit determines that there is a possibility that the vehicle slides down rearwards on an uphill road, the sliding-down preventing process executing unit controls the target axle torque FF calculation unit to calculate and output the feed-forward calculation value of the target axle torque so as to reach the axle torque which is obtained by reducing the predetermined positive amount from the estimated value of axle torque necessary for the vehicle to achieve the target acceleration against the driving resistance, and controls the target axle torque FB calculation unit to limit an increase in the feedback calculation value of the target axle torque so as to prevent effect caused by reduction of the predetermined positive amount in the target axle torque FF calculation unit from being canceled.

3. The braking/driving control apparatus according to claim 2, further comprising:

a sliding-down determining unit which determines whether the vehicle actually slides down, wherein the sliding-down preventing process executing unit increases a proportional gain of a term of a proportional control in the feedback calculation of the target axle torque FB calculation unit based on that the sliding-down determining unit determines the vehicle actually slides down.

* * * * *